(12) United States Patent
Zhou

(10) Patent No.: US 11,200,426 B2
(45) Date of Patent: Dec. 14, 2021

(54) VIDEO FRAME EXTRACTION METHOD AND APPARATUS, COMPUTER-READABLE MEDIUM

(71) Applicant: TENCENT TECHNOLOGY (SHENZHEN) COMPANY LIMITED, Shenzhen (CN)

(72) Inventor: Wenhuan Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/024,630

(22) Filed: Sep. 17, 2020

(65) Prior Publication Data

US 2021/0004604 A1 Jan. 7, 2021

Related U.S. Application Data

(63) Continuation of application No. PCT/CN2019/092280, filed on Jun. 21, 2019.

(30) Foreign Application Priority Data

Jul. 9, 2018 (CN) .......................... 201810745214.X

(51) Int. Cl.
  *H04N 9/80* (2006.01)
  *G06K 9/00* (2006.01)
  *H04N 19/44* (2014.01)

(52) U.S. Cl.
  CPC ..... *G06K 9/00744* (2013.01); *G06K 9/00718* (2013.01); *H04N 19/44* (2014.11)

(58) Field of Classification Search
  CPC ........... G06K 9/00718; G06K 9/00744; H04N 19/44; H04N 21/440263; H04N 21/4884; H04N 21/8455; H04N 21/8547

(Continued)

(56) References Cited

U.S. PATENT DOCUMENTS

| 8,639,089 B2 * | 1/2014 | Kusunoki ........ H04N 21/44008 386/239 |
| 2005/0180730 A1 | 8/2005 | Huh et al. |

(Continued)

FOREIGN PATENT DOCUMENTS

| CN | 1658663 A | 8/2005 |
| CN | 101031085 A | 9/2007 |

(Continued)

OTHER PUBLICATIONS

The World Intellectual Property Organization (WIPO) International Search Report for PCT/CN2019/092280 dated Sep. 2, 2019 5 Pages (including translation).

(Continued)

*Primary Examiner* — Robert Chevalier
(74) *Attorney, Agent, or Firm* — Anova Law Group, PLLC

(57) ABSTRACT

A video frame extraction method performed by a computing device includes: obtaining a key frame timestamp table of a video based on a first sampling stride, the first sampling stride being adjusted according to a length of the object video; obtaining a timestamp of a key frame to be extracted from the key frame timestamp table based on a second sampling stride, the second sampling stride being determined according to a quantity of key frame timestamps in the key frame timestamp table and a quantity of to-be-extracted key frames; reading, according to the timestamp, frame data of the key frame; and generating, based on a hard decoding result of the frame data, a thumbnail corresponding to the key frame.

20 Claims, 7 Drawing Sheets

(58) Field of Classification Search
USPC .............. 386/241, 239, 243, 248, 278, 281
See application file for complete search history.

(56) References Cited

U.S. PATENT DOCUMENTS

| | | | |
|---|---|---|---|
| 2008/0165847 A1 | 7/2008 | Kim | |
| 2015/0062353 A1* | 3/2015 | Dalal | H04N 21/234 348/194 |
| 2017/0242554 A1* | 8/2017 | Nanjunda Iyer | G06F 16/739 |
| 2018/0137892 A1* | 5/2018 | Ding | G06K 9/3241 |

FOREIGN PATENT DOCUMENTS

| | | |
|---|---|---|
| CN | 102780919 A | 11/2012 |
| CN | 104010197 A | 8/2014 |
| CN | 104144322 A | 11/2014 |
| CN | 105100961 A | 11/2015 |
| CN | 105957017 A | 9/2016 |
| CN | 106713964 A | 5/2017 |
| CN | 106851437 A | 6/2017 |
| CN | 107295402 A | 10/2017 |
| CN | 107484039 A | 12/2017 |
| CN | 108171189 A | 6/2018 |
| CN | 108810622 A | 11/2018 |

OTHER PUBLICATIONS

The State Intellectual Property Office of the People's Republic of China (SIPO) Office Action 1 for 201810745214.X dated Jul. 25, 2019 15 Pages (including translation).
The State Intellectual Property Office of the People's Republic of China (SIPO) Office Action 2 for 201810745214.X dated Sep. 20, 2019 11 Pages (including translation).

* cited by examiner

VIDEO FRAME EXTRACTION METHOD AND APPARATUS, COMPUTER-READABLE MEDIUM

CROSS-REFERENCES TO RELATED APPLICATIONS

This application is a continuation application of PCT Patent Application No. PCT/CN2019/092280, filed on Jun. 21, 2019, which claims priority to Chinese Patent Application No. 201810745214.X, entitled "VIDEO FRAME EXTRACTION METHOD AND APPARATUS, COMPUTER-READABLE MEDIUM, AND ELECTRONIC DEVICE" and filed on Jul. 9, 2018, the entire contents of both of which are incorporated herein by reference.

FIELD OF THE TECHNOLOGY

The present disclosure relates to the field of computer technologies, and specifically, to a video frame extraction method and apparatus, a computer-readable medium, and an electronic device.

BACKGROUND OF THE DISCLOSURE

With the development of computer application technologies and the Internet, especially the mobile Internet, the volume of information circulated on the network has explosively increased. Increasing fields choose to provide services for users through the network, and video content has become an important media on the network.

Besides conventional functions for video content such as browsing and viewing, increasingly abundant functions, such as, thumbnail preview, bullet screen and the like have been developed in recent years, thereby improving user experiences. The thumbnail preview, used as a special example, has been widely applied to different application scenarios, such as, video viewing, editing and the like.

To implement the function of the thumbnail preview, data of some key frames needs to be extracted from complete video data, so that the data of the key frames is displayed to the users in an image form.

The information disclosed in the above background section is only used for enhancing the understanding of the background of the present disclosure. Therefore, information that does not constitute the related art known to a person of ordinary skill in the art may be included.

SUMMARY

Embodiments of the present disclosure provide a video frame extraction method and apparatus, a computer-readable medium, and an electronic device.

According to an aspect of the embodiments of the present disclosure, a video frame extraction method performed by a computing device is provided, including: obtaining a key frame timestamp table of a video based on a first sampling stride, the first sampling stride being adjusted according to a length of the object video; obtaining a timestamp of a key frame to be extracted from the key frame timestamp table based on a second sampling stride, the second sampling stride being determined according to a quantity of key frame timestamps in the key frame timestamp table and a quantity of to-be-extracted key frames; reading, according to the timestamp, frame data of the key frame; and generating, based on a hard decoding result of the frame data, a thumbnail corresponding to the key frame.

According to an aspect of the embodiments of the present disclosure, a video frame extraction apparatus is provided, including: a memory and a processor. The processor is configured to perform: obtaining a key frame timestamp table of a video based on a first sampling stride, the first sampling stride being adjusted according to a length of the object video; obtaining a timestamp of a key frame to be extracted from the key frame timestamp table based on a second sampling stride, the second sampling stride being determined according to a quantity of key frame timestamps in the key frame timestamp table and a quantity of to-be-extracted key frames; reading, according to the timestamp, frame data of the key frame; and generating, based on a hard decoding result of the frame data, a thumbnail corresponding to the key frame.

According to an aspect of the embodiments of the present disclosure, a non-transitory computer-readable medium is provided, storing a computer program, the computer program, when executed by a processor, cause the processor to perform: obtaining a key frame timestamp table of a video based on a first sampling stride, the first sampling stride being adjusted according to a length of the object video; obtaining a timestamp of a key frame to be extracted from the key frame timestamp table based on a second sampling stride, the second sampling stride being determined according to a quantity of key frame timestamps in the key frame timestamp table and a quantity of to-be-extracted key frames; reading, according to the timestamp, frame data of the key frame; and generating, based on a hard decoding result of the frame data, a thumbnail corresponding to the key frame.

It is to be understood that the foregoing general descriptions and the following detailed descriptions are only exemplary and explanatory, and cannot limit the present disclosure.

BRIEF DESCRIPTION OF THE DRAWINGS

Accompanying drawings herein are incorporated into the specification and form a part of this specification, show embodiments that conform to the present disclosure, and are used for describing a principle of the present disclosure together with this specification. The accompanying drawings described below are only some embodiments of the present disclosure. In the accompanying drawings.

DESCRIPTION OF EMBODIMENTS

Exemplary embodiments are described more fully with reference to accompanying drawings. However, the exemplary embodiments can be implemented in various forms and are not be understood as being limited to examples herein; on the contrary, providing the embodiments makes the present disclosure more comprehensive and complete.

In addition, described features, structures or features may be combined in one or more embodiments in any suitable manner. In the following description, many specific details are provided to give a full understanding of the embodiments of the present disclosure.

A block diagram shown in the accompanying drawings is only a functional entity and does not necessarily correspond to a physically independent entity. That is, the functional entities can be implemented in the form of software, in one or more hardware modules or integrated circuits, or in different networks and/or processor apparatuses and/or microcontroller apparatuses.

A flowchart shown in the accompanying drawings is only an exemplary description, not necessarily including all contents and operations/steps, nor being carried out in the order described. For example, some operations/steps may be further decomposed, while some operations/steps may be merged or partially merged, so the actual execution order may change according to the actual situation.

Figure 1:
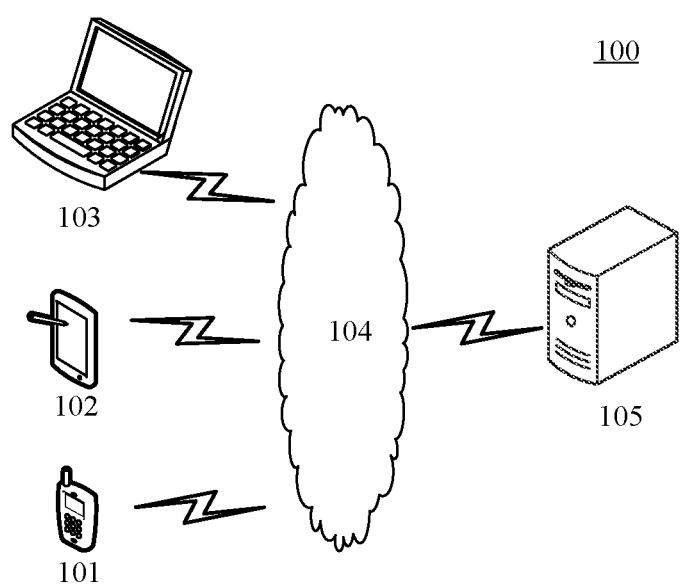
FIG. 1 is a schematic diagram of an exemplary system architecture to which a video frame extraction method or a video frame extraction apparatus according to an embodiment of the present disclosure may be applied.

FIG. 1 is a schematic diagram of an exemplary system architecture 100 to which a video frame extraction method or a video frame extraction apparatus according to an embodiment of the present disclosure may be applied.

As shown in FIG. 1, the system architecture 100 may include one or more of terminal devices 101, 102, and 103, a network 104 and a server 105. The network 104 is configured to provide a communication link medium between the terminal devices 101, 102, and 103 and the server 105. The network 104 may include various connection types, such as, a wired communication link, a wireless communication link, and the like.

It is to be understood that the quantities of terminal devices, networks, and servers in FIG. 1 are only schematic. According to implementation requirements, there may be any quantities of terminal devices, networks and servers. For example, the server 105 may be a server cluster including a plurality of servers, or the like.

A user may use the terminal devices 101, 102, and 103 to interact with the server 105 through the network 104, to receive or send messages, or the like. The terminal devices 101, 102, and 103 may be various electronic devices having displays, including but not limited to, smartphones, tablets, portable computers, desktop computers, and the like.

The server 105 may be a server providing various services. For example, a user requests, from the server 105, a to-be-processed video, such as, a real-time live video, a user generated content (UGC) video, a game video, or the like by using the terminal device 103 (or the terminal device 101 or 102). The terminal device 103 may extract, after receiving an object video file or address returned by the server 105, a preset quantity of video frames from an object video, generate a thumbnail, and display the thumbnail to users. For example, the terminal device 103 may obtain a key frame timestamp table of an object video based on a first sampling stride, the first sampling stride being adjusted according to a length of the object video; obtain a timestamp of a to-be-extracted key frame from the key frame timestamp table based on a second sampling stride, the second sampling stride being determined according to a quantity of key frame timestamps in the key frame timestamp table and a quantity of to-be-extracted key frames; and read frame data of a corresponding key frame according to the timestamp, and generate a thumbnail corresponding to the key frame based on a hard decoding result of the frame data.

In another embodiment, a user may perform, by using the terminal device 103, the foregoing processing on a video file stored locally, or, the server 105, after performing the foregoing processing, returns a result to the terminal device 103.

The video frame extraction method provided in some embodiments of the present disclosure is generally performed by the terminal device, and correspondingly, the video frame extraction apparatus is generally disposed in the terminal device. However, in other embodiments of the present disclosure, a server can complete similar processing to perform the video frame extraction solution provided in some embodiments of the present disclosure.

Figure 2:
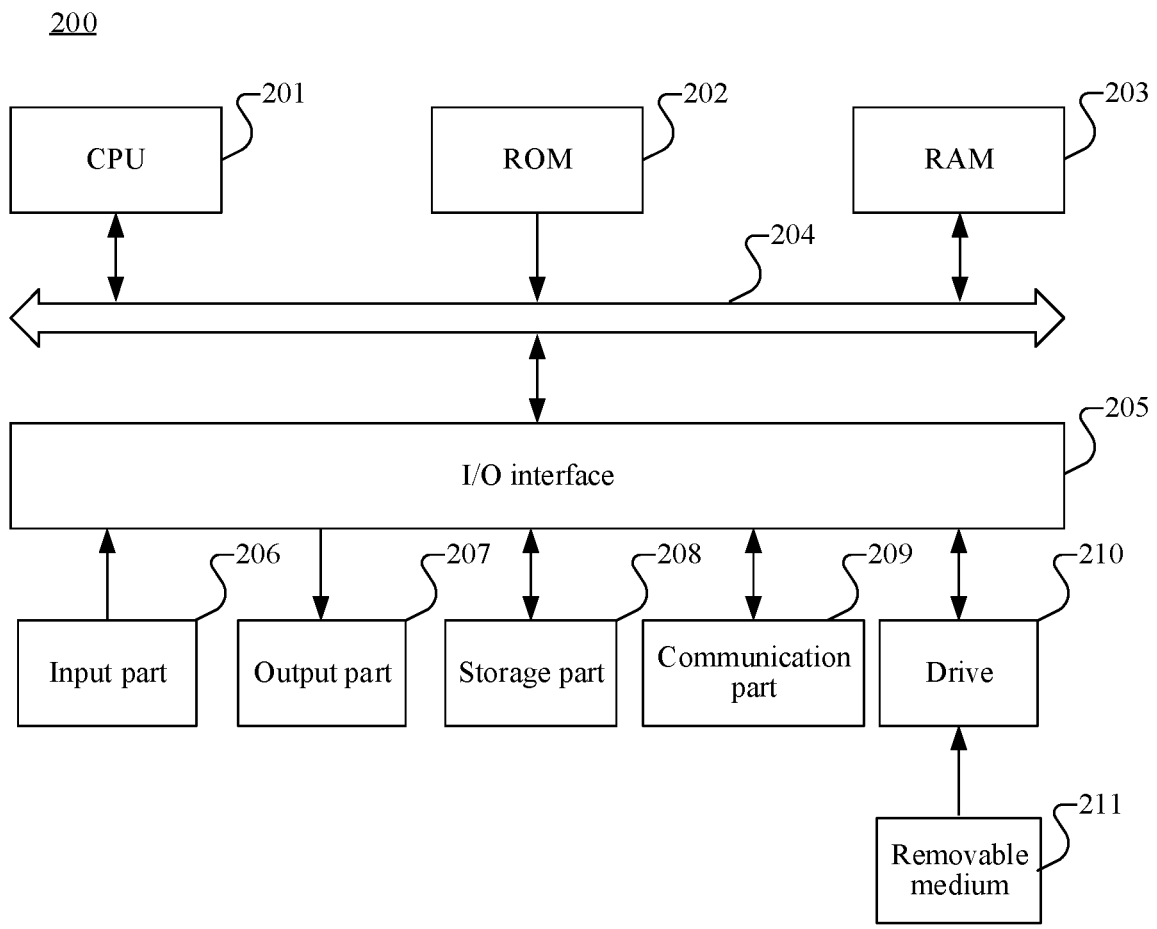
FIG. 2 is a schematic structural diagram of a computer system adapted to implement an electronic device according to an embodiment of the present disclosure.

FIG. 2 is a schematic structural diagram of a computer system adapted to implement an electronic device according to an embodiment of the present disclosure.

A computer system 200 of the electronic device shown in FIG. 2 is only an example, and is not to impose any restriction on functions and scopes of use of the embodiments of the present disclosure.

As shown in FIG. 2, the computer system 200 includes a central processing unit (CPU) 201. The CPU can perform various proper actions and processing based on a program stored in a read-only memory (ROM) 202 or a program loaded from a storage part 208 into a random access memory (RAM) 203. The RAM 203 also stores various programs and data required to operate the system. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk, or the like; and a communication part 209 including a network interface card such as a LAN card, a modem, or the like. The communication part 209 performs communication processing through a network such as the Internet. A drive 210 is also connected to the I/O interface 205 as needed. A removable medium 211, such as a magnetic disk, an optical disk, a magneto-optical disk, a semiconductor memory or the like, is installed on the drive 210 as needed, so that a computer program read therefrom is installed into the storage part 208 as needed.

Particularly, according to an embodiment of the present disclosure, the processes described in the following by referring to the flowcharts may be implemented as computer software programs. For example, one embodiment of the present disclosure includes a computer program product, the computer program product includes a computer program carried on a computer-readable medium, and the computer program includes program code used for performing the methods shown in the flowcharts. In such an embodiment, the computer program may be downloaded and installed through the communication part 209 from a network, and/or installed from the removable medium 211. When the computer program is executed by the central processing unit (CPU) 201, the various functions defined in the system of the present disclosure are executed.

The computer-readable medium shown in the present disclosure may be a computer-readable signal medium or a computer-readable storage medium or any combination of the two. The computer-readable storage medium may be, for example, but not limited to, an electrical, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the present disclosure. In this regard, each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be basically performed in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described can also be set in a processor. Names of the units do not constitute a limitation on the units in a case.

According to another aspect, the present disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the following embodiment. For example, the electronic device may implement steps shown in FIG. 3 to FIG. 6, and FIG. 8.

The implementation details of the technical solution of one embodiment of the present disclosure are described in detail in the following.

Figure 3:
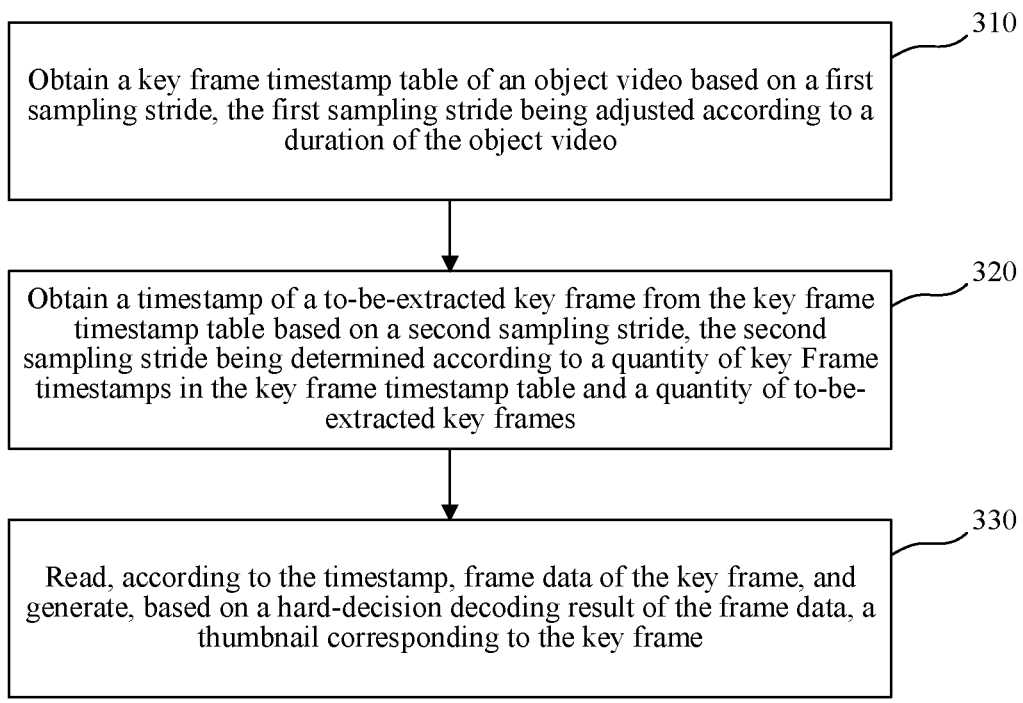
FIG. 3 is a schematic flowchart of a video frame extraction method according to an embodiment of the present disclosure.

FIG. 3 is a schematic flowchart of a video frame extraction method according to an embodiment of the present disclosure. The video frame extraction method is applicable to the electronic device described in the foregoing embodiment. Referring to FIG. 3, the video frame extraction method includes at least steps 310 to 330. A detailed description is as follows:

In step 310: Obtain a key frame timestamp table of an object video based on a first sampling stride, the first sampling stride being adjusted according to a length (or duration) of the object video.

In an embodiment, the object video includes a current to-be-processed video file. For example, an electronic device may determine, based on a selection operation of a user, the object video from a video library stored locally, or may download a corresponding object video from a server based on an access request of a user to start a processing process in which a video frame is extracted from the object video.

In the related art, after the object video is determined, generally, the video frame extraction is directly started. For example, frame pictures are extracted from the object video according to a fixed time interval. In this way, for a video having a relatively short length, what may be lastly extracted are all repeated frame pictures; and for a video having a relatively long length, what may be extracted are frame pictures in the front, resulting in missing important frames in the back, the extracted frame pictures may be not quite representative for the whole object video.

The foregoing problem is resolved by using a two-time sampling method in one embodiment.

For first-time sampling, in step 310, an electronic device may obtain a key frame timestamp table of an object video based on a first sampling stride. The first sampling stride herein may be adjusted according to a length of the object video, so that a key frame timestamp obtained through the first-time sampling can cover an entire length of the object video as much as possible, to ensure that second-time sampling has sufficient key frame objects that are enough to cover the entire video to be used as a sampling basis.

The key frame herein is also referred to as I frame. The I frame is a most important frame of interframe compression encoding. Specifically, the video is encoded in groups, and each group is referred to as a GOP (group of pictures). The key frame may be understood as a complete picture, each GOP starts from the key frame, and frames in the middle of the GOP are all incomplete, and are obtained by the key frame, previous frames, following frames and the like through calculation.

For the above characteristics, in one embodiment of the present disclosure, a corresponding thumbnail is generated by extracting a key frame. The key frame timestamp is timestamp information corresponding to a sampled key frame. In other words, in the first-time sampling related to step 310, the electronic device records only a timestamp of the key frame instead of reading frame data of the key frame, and stores the timestamp of the key frame in the form of a table as a basis of the subsequent second-time sampling.

In an embodiment, the foregoing first sampling stride ts1 is adjusted according to the length T of the object video, for example, may include the following cases:

when 0<T<10 s, the ts1 may be set to 200 ms, that is, a key frame timestamp is extracted every 200 ms;

when 10 s≤T<60 s, the ts1 may be set to 1 s, that is, a key frame timestamp is extracted every 1 s;

when 60 s≤T<5*60 s, the ts1 may be set to 5 s, that is, a key frame timestamp is extracted every 5 s;

when 5*60≤T<60*60 s, the ts1 may be set to 10 s, that is, a key frame timestamp is extracted every 10 s;

when 60*60 s≤T<2*60*60 s, the ts1 may be set to 20 s, that is, a key frame timestamp is extracted every 20 s; and when T≥2*60*60 s, the ts1 may be set to 30 s.

In an embodiment, in step 310, the electronic device may traverse the key frame in the object video by using a seekTo method provided by MediaExtractor, and extract timestamp information of the key frame according to the first sampling stride by using the getSampleTime method provided by MediaExtractor.

A video having a length of 30 s is used as an example, and if the first sampling stride ts1 is set to, for example, 1 s according to the foregoing embodiment, the key frame timestamp table obtained in step 310 is, for example, in the form of the following table 1:

TABLE 1

An example of the key frame timestamp table

| Key frame serial number | Timestamp (ms) |
|---|---|
| 1 | 0001011 |
| 2 | 0002016 |
| 3 | 0003081 |
| ... | |
| 15 | 0015000 |
| 16 | 0016007 |
| ... | |
| 29 | 0019101 |
| 30 | 0019096 |

For convenience of conciseness, timestamp information with key frame serial numbers 4 to 14 and 17 to 28 is omitted in table 1.

In addition, it may be learned from the table 1 that an interval between timestamps of adjacent key frames is not necessarily strictly 1000 ms (that is, 1 s), because frames in positions at the interval of 1000 ms are not necessarily key frames. For example, the seekTo method in the foregoing embodiment may be adopted to automatically record a key frame closest to a corresponding position in the foregoing timestamp table.

Still referring to FIG. 3, in step 320: Obtain a timestamp of a to-be-extracted key frame from the key frame timestamp table based on a second sampling stride, the second sampling stride being determined according to a quantity of key frame timestamps of the key frame timestamp table and a quantity of to-be-extracted key frames.

According to one embodiment of the present disclosure, for example, a preview area may be displayed in a video cropping interface of video editing software or a video editing application, to display a thumbnail of a key frame within a specific length. A length of a video displayed in the preview area may be set to 5 minutes, the length of the video is represented by using 600 pixels in a width direction of the preview area, and a width of each thumbnail is 60 pixels.

Therefore, it may be known that the quantity of to-be-extracted key frames is 10. If the width of each thumbnail is 30 pixels, it may be known that the quantity of to-be-extracted key frames is 20, and so on. The quantity of the to-be-extracted key frames may be preset by using such a method. The quantity of the to-be-extracted key frames is also the quantity of to-be-extracted key frames.

Based on step 310, it may be ensured that a quantity of extracted key frames in the key frame timestamp table is greater than or equal to a quantity of frame pictures that are expected to be extracted. Therefore, in step 320, the key frame timestamp table is sampled (second-time sampling) to obtain a key frame timestamp expected to be extracted.

Herein, the second sampling stride may be determined according to the quantity of the key frame timestamps in the key frame timestamp table and the quantity of the to-be-extracted key frames.

For example, if the quantity of key frame timestamps in the key frame timestamp table is m, and the quantity of timestamps of the to-be-extracted key frames is n, the second sampling stride may be set to [m/n], "[ ]" representing that a result of dividing m by n is rounded. Further, in step 320, the timestamps of the to-be-extracted key frames may be obtained from the key frame timestamp table according to index=[m/n]*i+[m/n]/a, index representing an index or a serial number of each key frame timestamp in the key frame timestamp table, i representing an index of a timestamp of a to-be-extracted key frame, and a being a positive integer, representing that the key frame timestamp is expected to be extracted from 1/a of the second sampling stride. A specific example is used below for detailed description.

If a length of an object video is 30 s, for example, the key frame timestamp table shown in table 1 may be obtained based on step 310, the quantity m of key frame timestamps thereof being 30. If the quantity n of the to-be-extracted key frames is 10, the second sampling stride may be set to [m/n]=3. For example, if a=3 is set, an index position of a first key frame (the number thereof is 0) extracted from the key frame timestamp table is index=3*0+3/3=1, that is, a first item in the key frame timestamp table is extracted, and so on. A key frame timestamp obtained in step 320 is, for example, in the form of table 2.

TABLE 2 an example of a to-be-extracted key frame table

| Serial number of to-be-extracted key frame | Index position in key frame timestamp table | Timestamp (ms) |
|---|---|---|
| 0 | 1 | 0001011 |
| 1 | 4 | 0004061 |
| 2 | 7 | 0007018 |
| ... | | |
| 8 | 25 | 0024991 |
| 9 | 28 | 0028066 |

It can be learned from table 2 that the second-time sampling based on step 320 may obtain information of a to-be-extracted video key frame timestamp based on table 1.

Still referring to FIG. 3, in step 330: Read, according to the timestamp of the to-be-extracted key frame, frame data of the key frame, and generate, based on a hard decoding result of the frame data, a thumbnail corresponding to the key frame.

Information of the timestamp of the to-be-extracted key frame may be obtained sequentially through the first-time sampling in step 310 and the second-time sampling in step 320. In step 330, corresponding key frame data needs to be read according to the information to generate a corresponding thumbnail.

An Android system is used as an example, and generally, in the related art, a frame picture of a video file is extracted according to a fixed time interval by using a getFrameAtTime method provided by a MediaMetaDataRetrieve class of the system. When a frame picture is extracted by using such a method, for a video having a relatively small sized video file and a relatively low resolution, a basic requirement of extraction may be met, for example, frame pictures may be completely extracted within 400 ms. However, if a size of a video file is relatively large and a resolution thereof is relatively high, it is very time-consuming to extract a video frame picture by using such a method. For example, for a sample video having a length of 30 minutes, a size of 246 M, and a resolution of 720*480, to extract each frame picture by using the foregoing method needs at least near 900 ms. In addition, as the file has a bigger size and a higher resolution, a longer time is consumed.

Therefore, in one embodiment of the present disclosure, in step 330, the electronic device reads corresponding frame data (in this case, which is a compressed video frame that is not decoded) according to a sampled timestamp of a to-be-extracted key frame in step 320, then decodes the video frame through hard decoding, restores the video frame to data before compression, and generates a corresponding thumbnail accordingly.

In an embodiment, the electronic device may move a data pointer to a key frame at a specified time point according to a to-be-extracted timestamp table (for example, the foregoing table 2) by using the seekTo method provided by the MediaExtractor class, and then read video frame data of the key frame by using a readSampleData method of the MediaExtractor class.

In an embodiment, the electronic device may decode the video frame data into YUV data through hard decoding, and then convert the YUV data into red green blue RGB data to obtain a bitmap corresponding to the key frame. YUV and RGB herein belong to different color space model representation methods to be respectively briefly described below.

Color Space Model

In digital image processing, generally, a color is described by using three independent attributes. The three independent variables work together to form a space coordinate to form the so-called color space. Common color space models include two types: a primary color space and a color space in which chrominance is separated from luminance. A typical representative of the former is RGB (respectively corresponding to red, green, and blue), and the latter includes YUV (Y represents luminance, and UV represents chrominance) and HSV (respectively corresponding to hue, saturation, and value) and the like. RGB and YUV are further briefly described below.

RGB

In the RGB color space, any color light may be generated by adding and mixing different components of the three colors of R, G, and B. When the components of the three primary colors are all 0 (weakest), the mixed color light is black light; and when the components of the three primary colors are all maximum, the mixed color light is white light.

According to different quantities of storage bytes occupied by each component in a computer, the RGB color space generally includes several types, such as RGB555, RGB565, RGB24 and RGB32, respectively corresponding to cases that each pixel occupies 16-bit, 16-bit, 24-bit and 32-bit storage bytes.

YUV

YUV (also referred to as YCrCb) is a color encoding method adopted by the European television system. The YUV is characterized in that a luminance signal Y thereof is separated from chrominance signals U and V thereof. In this way, if there is only a Y signal component and there are no U and V signal components, a represented image is a black-and-white grayscale image.

Different from RGB in which each pixel has three independent color component values, YUV is divided into formats such as YUV444, YUV422, YUV420 and the like according to different quantities of U and V samples. YUV420, used as an example, represents that each pixel has an independent Y component, and chrominance, namely, U and V components are shared by every 4 pixels. In this way, the storage efficiency is improved by converting an image from the RGB space into the YUV space.

In summary, RGB and YUV have respective characteristics. When an image is transmitted and stored, to save network and storage resources, the image is generally converted from RGB into YUV first, and then an encoding compression operation is performed based on YUV data. On the other hand, because a majority of image processing operations are still based on an RGB format, it is necessary to convert a YUV format into an RGB format when the image is post-processed and displayed.

For example, in step 330, the YUV data before compression is obtained after hard decoding is performed on the video frame. To generate a corresponding thumbnail for display, the YUV data may be converted into RGB data.

In an embodiment, a formula of conversion from YUV into RGB is shown as follows (each of RGB values ranges from 0 to 255):

$$R=Y+1.402(V-128)$$

$$G=Y-0.34414(U-128)-0.71414(V-128)$$

$$B=Y+1.772(U-128)$$

Based on the video frame extraction method provided in the foregoing embodiment of the present disclosure, a sampling interval of the key frame timestamp is adaptively adjusted according to the video length, and then second-time sampling is performed in the key frame timestamp table according to the quantity of thumbnails required. A sampling result is processed based on the hard decoding method to generate a thumbnail. This can prevent problems of missing frames and duplicate frames in the extraction process to shorten the processing time and improve the processing efficiency.

Figure 4:
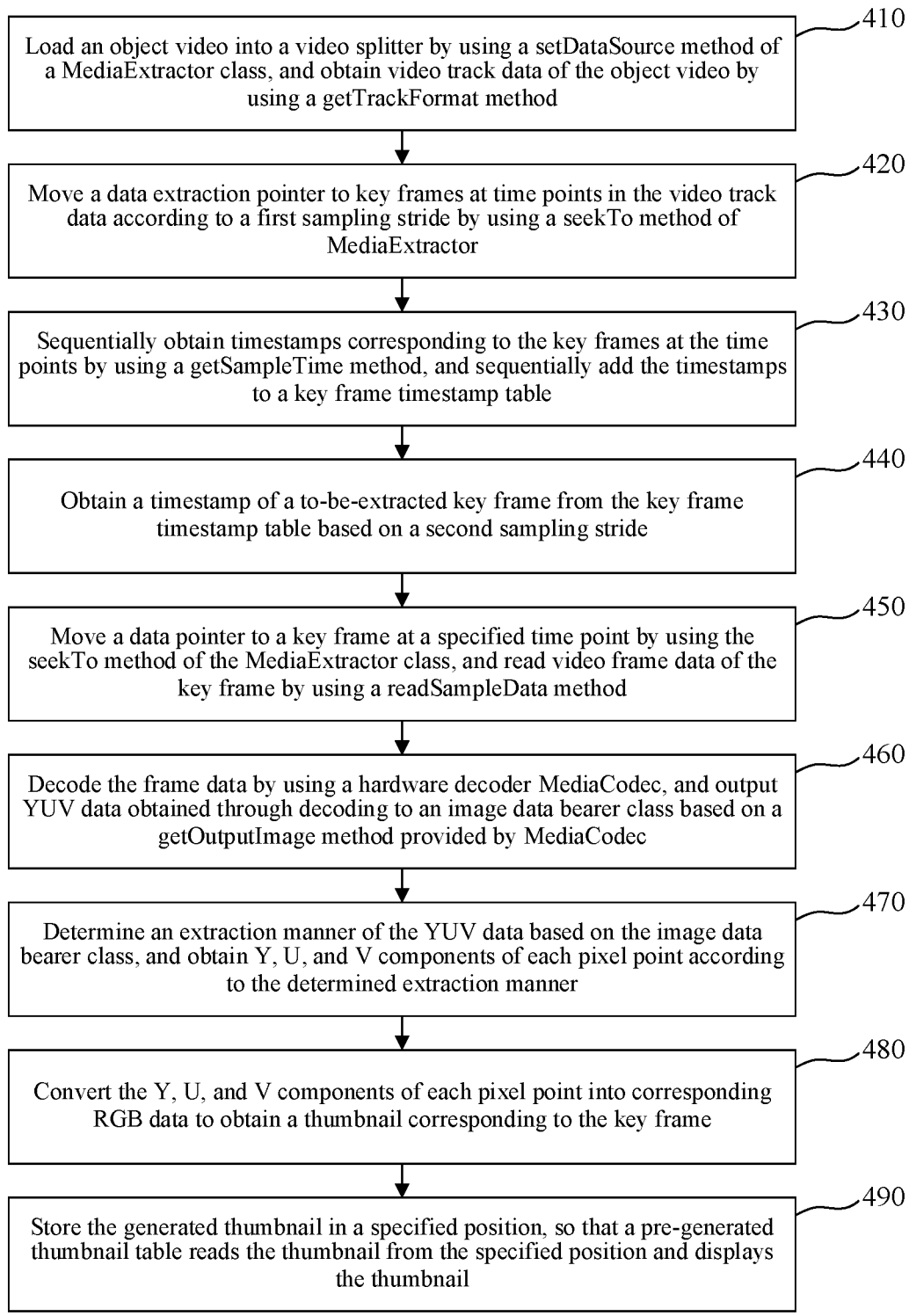
FIG. 4 is a schematic flowchart of a video frame extraction method according to an embodiment of the present disclosure.

FIG. 4 is a schematic flowchart of a video frame extraction method according to another embodiment of the present disclosure. The video frame extraction method is applicable to the electronic device described in the foregoing embodiment. Referring to FIG. 4, the video frame extraction method includes at least steps 410 to 490. A detailed description is as follows:

In step 410: Load an object video into a video splitter by using a setDataSource method of a MediaExtractor class, and obtain video track data of the object video by using a getTrackFormat method.

As a class provided by the Android system, MediaExtractor may be used for separating a video track from an audio track in a container.

In an embodiment, for example, after a user selects a video file in a web page or an application program, an electronic device obtains a storage address URL of the video file according to a selection of the user. Then, the electronic device may load the video file into the video splitter by using the setDataSource method of MediaExtractor to extract video information of the video track; and then obtain format information of the extracted track by using the getTrackFormat method, and determine whether the format information of the current track is the video track; and if the format information of the current track is the video track, record index information of the current track; otherwise, traverse all tracks until all the video track data of the object video is obtained.

In step 420: Move a data extraction pointer to key frames at time points in the video track data according to a first sampling stride by using a seekTo method of MediaExtractor.

The seekTo method of the MediaExtractor class is generally used for traversing all key frames in the video. In one embodiment, the key frames at the time points in the object video may be positioned according to a preset sampling stride by changing a parameter (time, in milliseconds) of the seekTo method.

The first sampling stride may be adaptively adjusted according to a length of the object video. For related solutions, reference may be made to the detailed description of step 310 in the foregoing embodiment, and details are not described herein again.

In step 430: Sequentially obtain timestamps corresponding to the key frames at the time points by using a getSampleTime method, and sequentially add the timestamps to a key frame timestamp table.

The getSampleTime of the MediaExtractor class may be used for extracting timestamp information of a current frame.

In step 420, the data extraction pointer is moved to the key frames at the time points according to the first sampling stride, and in this step, timestamp information of the key frame currently indicated by the data extraction pointer is obtained by using the getSampleTime method, and added to the key frame timestamp table.

Figure 5:
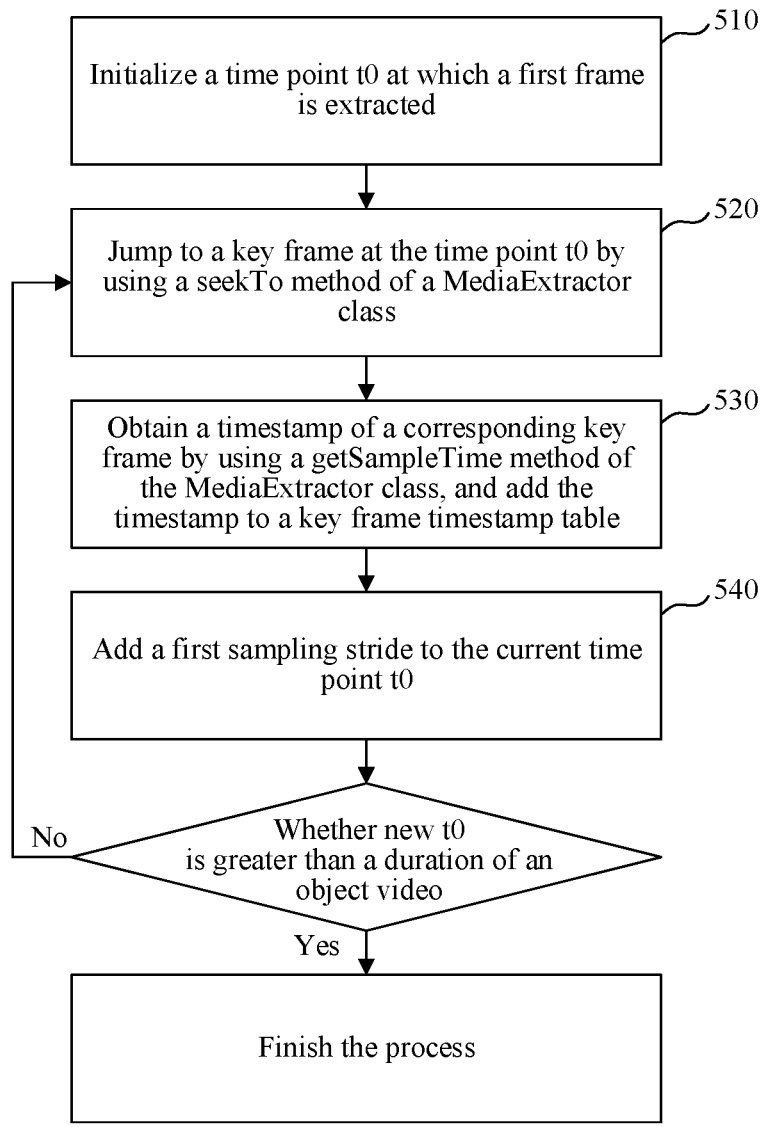
FIG. 5 is a schematic exemplary flowchart of generating a key frame timestamp table.

FIG. 5 is a schematic exemplary flowchart of generating a key frame timestamp table. This may be viewed as a more specific embodiment of steps 420 and 430. As shown in FIG. 5, an exemplary process includes steps 510 to 540.

In step 510: Initialize a time point t0 at which a first frame is extracted.

For example, t0=1 s, that is, 1000 ms may be set.

In step 520: Jump to a key frame at the time point t0 by using a seekTo method of a MediaExtractor class.

As described above, a data extraction pointer may be moved to a video key frame picture at a specified time point by using the seekTo method.

In step 530: Obtain a timestamp of a corresponding key frame by using a getSampleTime method of the MediaExtractor class, and add the timestamp to a key frame timestamp table.

As described above, a video frame at the time point t0 (that is, 1000 ms) may be not a key frame, jumping to a key frame at a time point closest to the time point t0 may be performed by using the seekTo method, and then corresponding timestamp information may be obtained by using the getSampleTime method.

In step 540: Add a first sampling stride to the current time point t0 to determine whether new t0 is greater than a length of an object video; and if new t0 is greater than the length of the object video, finish the process; otherwise, return to step 520.

As described above, the first sampling stride herein may be adaptively adjusted according to a length of the object video, and details are not described herein again.

Based on step 540, the process repeats steps 520 to 540 until a result of adding the first sampling stride to a final current time point is greater than the length of the object video.

A video having a length of 30 s is still used as an example. If the first sampling stride is set to 1 s, a key frame timestamp table finally obtained in step 430 is, for example, shown in the foregoing table 1.

Steps 410 to 430 may be a specific implementation of step 310 in FIG. 3.

Still referring to FIG. 4, in step 440: Obtain a timestamp of a to-be-extracted key frame from the key frame timestamp table based on a second sampling stride.

For step 440, reference may be made to descriptions of step 320 in the foregoing embodiment, and details are not described herein again.

A video having a length of 30 s is still used as an example. If the key frame timestamp table shown in table 1 may be obtained based on step 430, and if the quantity of to-be-extracted key frames is 10, the second sampling stride may be set to 3, an index position of a first key frame (the index or serial number thereof is 0) extracted from the key frame timestamp table is index=3*0+3/3=1, that is, a first item (i.e., key frame timestamp) in the key frame timestamp table is extracted, and so on. A key frame timestamp obtained in step 440 is, for example, in the form of table 2.

In step 450: Move a data pointer to a key frame at a specified time point by using the seekTo method of the MediaExtractor class, and then read video frame data of the key frame by using the readSampleData method.

Different from step 420 in which the key frame is positioned according to the first sampling stride by using the seekTo method, in this step, the timestamp of the to-be-extracted key frame is obtained based on step 440, so that the to-be-extracted key frame may be directly positioned by using the seekTo method, and then the video frame data of the key frame may be read by using the readSampleData method.

In step 460: Decode the frame data by using a hardware decoder MediaCodec, and output YUV data obtained through decoding to an image data bearer class based on a getOutputImage method provided by MediaCodec.

The frame data read by using the readSampleData method in step 450 is a compressed video frame that is not decoded, and in step 460, the frame data is decoded into YUV data before compression by using the hardware decoder MediaCodec.

Figure 6:
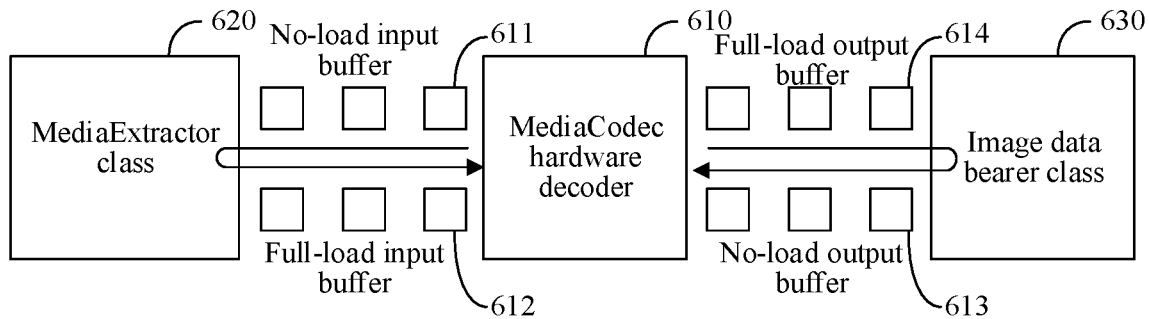
FIG. 6 is a schematic diagram of an exemplary processing process of a hardware decoder.

In an embodiment, MediaCodec processes data in an asynchronous manner and respectively processes input data and output data by using a group of input and output buffers. FIG. 6 is a schematic diagram of an exemplary processing process of a hardware decoder, and the processing process of MediaCodec is briefly described below with reference to FIG. 6.

First, an electronic device may request a no-load input buffer from a local hardware decoder 610, and after fully padding the no-load input buffer with data, transmit the input buffer to the hardware decoder 610 for processing. In an embodiment, as described in step 450, the electronic device may pad a no-load input buffer 611 with the read frame data by using a readSampleData method of a MediaExtractor class 620 to make the no-load input buffer become a full-load input buffer 612, and transmit the full-load input buffer 612 to the hardware decoder 610 for processing, and continue to request a new no-load input buffer 611 from the hardware decoder 610.

Second, the hardware decoder 610 extracts frame data in the full-load input buffer 612, decodes the frame data, pads a no-load output buffer 613 with the decoded data, and transmits a full-load output buffer 614 padded with the data to an image data bearer class 630 for subsequently extracting Y, U, and V components from the decoded data (referring to step 470) and converting the Y, U, and V components into an RGB format to generate a thumbnail (referring to step 480).

Based on data carried by the image data bearer class 630, each time a frame of thumbnail is generated, the no-load output buffer 613 is released to be reused by the hardware decoder 610, and another full-load output buffer 614 is requested or received from the hardware decoder 610 and processed.

Still referring to FIG. 4, in step 470: Determine an extraction manner of the YUV data based on the image data bearer class, and obtain Y, U, and V components of each pixel according to the determined extraction manner.

Because different chip manufacturers use different manners of encoding of frames in the YUV format, it is greatly troublesome to obtain video frame data in a specified format through decoding. In one embodiment of the present disclosure, an output frame data buffer is obtained by using the getOutputImage method, an object of the image data bearer class is returned, and then byteBuffer data in the image object is decoded into frame data in a specified YUV format.

As described above, YUV is divided into formats such as YUV444, YUV422 and YUV420 according to different quantities of U and V samples. YUV420, used as an example, represents that each pixel has an independent luminance representative, that is, Y component, and chrominance, that is, U and V components are shared by every 4 pixels.

For example, a 4×4 picture in the YUV420 format has 16 Y values, 4 U values and 4 V values. YUV420 is divided into a plurality of different formats, such as YUV420Planar, YUV420PackedPlanar, YUV420SemiPlanar and YUV420PackedSemiPlanar according to different storage orders of color data, but information actually stored in the formats is completely consistent. For example, a storage format of an 1420 (one type of YUV420Planar) memory is:

YYYYYYYYYYYYYYYYUUUUVVVV; and a storage format of an NV21 (one type of YUV420SemiPlanar) memory is:

YYYYYYYYYYYYYYYYVUVUVUVU.

In other words, for different formats, different decoding manners need to be adopted. If a format adopted specifically in encoding is unknown, data information of a frame in a specified YUV format cannot be obtained through decoding.

Therefore, in one embodiment of the present disclosure, the foregoing problem can be efficiently resolved by using YUV420Flexible (whose format is a collection of YUV420 formats) provided by Google and a video frame uncompressed data carrier class image returned by a decoder getOutputImage. Specifically, the image class provides a common storage method for various formats of YUV420, respectively stores Y, U, and V components corresponding to different formats under three different planes, and then obtains corresponding Y, U, and V components in a uniform extraction manner corresponding to different formats. Storage manners of Y components in different formats are the same, and U components and V components corresponding to the Y components correspond to different pixelStrides and rowStrides. Therefore, a specific extraction manner may be determined based on the two values. A specific example is used below for description.

For example, it is assumed that data read formats of three planes in an image object outputted in step 460 are shown in table 3:

TABLE 3

A schematic data read format of an image object

| Action/property | Value | Annotation |
| --- | --- | --- |
| image format | 35 | image |
| get data from 3 planes | | get data from 3 planes |
| pixelStride | 1 | pixelstride |
| rowStride | 1920 | rowStride |
| width | 1928 | width |
| height | 1080 | height |
| buffer size | 2088960 | buffer size |
| Finished reading data from plane 0 | | Finished reading data from plane 0 |
| pixelStride | 1 | pixelStride |
| rowStride | 960 | rowStride |
| width | 1928 | width |
| height | 1080 | height |
| buffer size | 522249 | buffer size |
| Finished reading data from plane 1 | | Finished reading data from plane 1 |
| pixelStride | 1 | pixelStride |
| rowStride | 960 | rowStride |
| width | 1928 | width |
| height | 1080 | height |
| buffer size | 522249 | buffer size |
| Finished reading data from plane 2 | | Finished reading data from plane 2 |

It can be learned from table 3 that the value of the image format is 35, representing that a common format of YUV_420_888 has 3 planes, a corresponding picture resolution is 1920×1080, and a quantity of pixels is 2073600. The buffer size is 2088960. Because a problem of memory alignment is involved, the buffer size is slightly larger than the actual quantity of pixels. It may be learned that the Y component includes all the pixels, while U and V each include only ¼ of the pixels. The rowStride in the Y component is 1920, and the pixelStride represents an interval of color values in a row, and a value of 1 represents no interval, that is, for a row of 1920 pixels, each has an independent value, and according to the buffer size thereof, a total of 1080 rows may be obtained; in the U component, a value of the pixelStride is 1, and a row of 1920 pixels have only 960 values, that is, every two pixels in the row share one U value, and according to the buffer size thereof, a total of 540 rows are obtained, that is, each two pixels between rows share one U value; if the pixelStride is 2, it represents that the color interval in the row is 1, that is, only when an index in the row is 0, 2, 4, 6 or the like, there is a value of the U component. A principle of extracting the V component is similar to that of extracting the U component, and details are not described herein again.

Still referring to FIG. 4, in step 480: Convert the Y, U, and V components of each pixel into corresponding RGB data to obtain a thumbnail corresponding to the key frame.

The Y, U, and V components of each pixel may be obtained in step 470, and the extracted Y, U, and V components may be converted into an RGB picture for storage in step 480.

Figure 7:
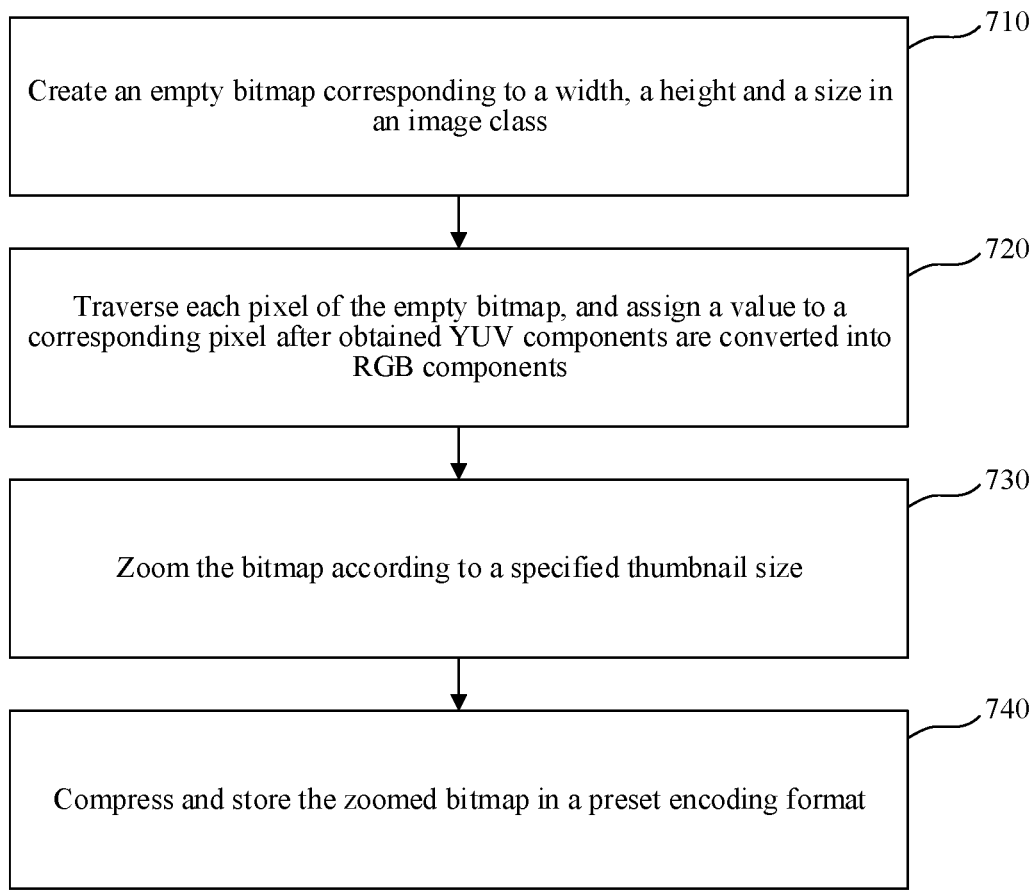
FIG. 7 is a schematic diagram of an exemplary process in which a bitmap is generated and stored.

FIG. 7 is a schematic diagram of an exemplary process in which a bitmap is generated and stored. This may be viewed as a more specific embodiment of step 480. As shown in FIG. 7, the exemplary process includes steps 710 to 740.

In step 710: Create an empty bitmap corresponding to a width, a height and a size in an image class.

Table 3 is used as an example, a picture resolution in the image class is 1920×1080, and in step 710, for example, a 1920×1080 empty bitmap may be created.

In step 720: Traverse each pixel of the empty bitmap, and assign a value to a corresponding pixel of the empty bitmap after obtained YUV components are converted into RGB components.

Since each pixel of the bitmap corresponds to three bytes of RGB, in step 720, corresponding RGB components are calculated based on the YUV components of each pixel obtained in step 470.

As described above, a formula of conversion from YUV into RGB may be, for example, shown as follows (RGB values range from 0 to 255):

$$R=Y+1.402(V-128)$$

$$G=Y-0.34414(U-128)-0.71414(V-128)$$

$$B=Y+1.772(U-128)$$

In step 730: Zoom the bitmap according to a specified thumbnail size.

Different sizes of a to-be-generated thumbnail may be further set according to different usage scenarios. Correspondingly, in step 730, the bitmap obtained in step 720 may be zoomed according to a set thumbnail size, so that occupied space of the bitmap can be reduced, thereby improving the loading efficiency of subsequent thumbnails.

In step 740: Compress and store the zoomed bitmap in a preset encoding format.

Different compression formats may alternatively be adopted for the to-be-generated thumbnail according to different usage scenarios. For example, in step 740, the zoomed bitmap may be compressed and stored as a picture in a JPEG format.

Still referring to FIG. 4, in step 490: Store the generated thumbnail in a specified position, so that a pre-generated thumbnail table reads the thumbnail from the specified position and displays the thumbnail.

The generated thumbnail may be displayed in different presentation manners according to different display scenes of the thumbnail. In an embodiment, the thumbnail table may specify a storage position of the thumbnail in advance. Once the thumbnail generation processing in steps 410 to 480 is finished, a generated thumbnail is stored in the specified position, and the thumbnail table may be notified to read a corresponding thumbnail from the specified position and display the thumbnail. Alternatively, the thumbnail table may read a corresponding thumbnail from the specified position through active periodic reading and display the thumbnail.

Figure 8:
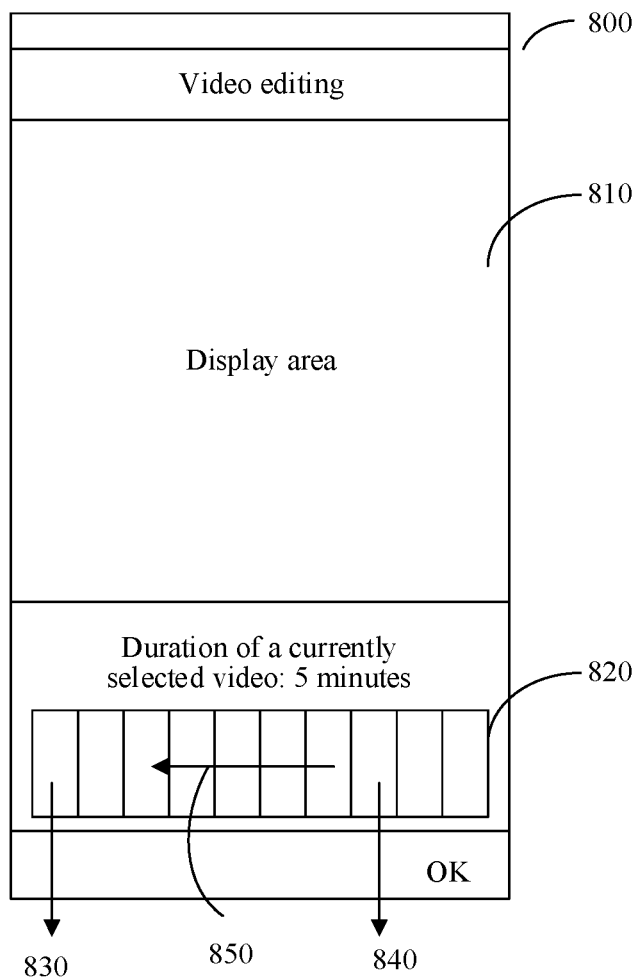
FIG. 8 schematically shows an exemplary user interface displaying a thumbnail in a video editing scene.

FIG. 8 schematically shows an exemplary user interface (UI) displaying a thumbnail in a video editing scene, such as, a video cropping interface 800 of video editing software/a video editing application. In the video cropping interface 800, a display area 810 is used for, for example, scrolling and playing a to-be-edited video selected by a user, and a preview area 820 is used for, for example, displaying a thumbnail within a specific length.

A premise of cropping a video is to select start and end time points 830 and 840 of the video. For example, for a video having a total length of 30 min (minutes), it is assumed that a length of a video that a user needs to crop is 5 min. To help the user to select a desirable 5-min segment from the 30-min video, a thumbnail may be extracted for the 30-min video based on steps 410 to 480, and a thumbnail of the 5-min video is always displayed in the preview area 820 according to a scrolling operation of the user on the thumbnail. The scrolling operation is, for example, in a direction indicated by an arrow 850 shown in FIG. 8.

For example, the preview area 820 initially displays thumbnails of 0-min to 5-min video segments. When the user performs an operation of scrolling or dragging a mouse, or an operation of pressing an arrow key on a keyboard, the preview area 820 may display a thumbnail of a 1-min to 6-min, 2-min to 7-min or 6-min to 10-min video segment according to an operation range to help the user to select start and end time points of the cropping. After the start and end time points are selected, the user may tap an OK button on the interface, so that the to-be-cropped video is obtained.

It may be learned from above that in an embodiment, the 5-min length may be represented through a specific width of the preview area 820. For example, if a corresponding width of the preview area 820 is 650 pix (pixels), a specific quantity of thumbnails may be extracted from key frames of the 5-min video, and displayed in an area having a width of 650 pix, and the scrolling operation of the user may be received to help the user to select other cropping time points of the video in the form of scrolling the thumbnail table for displaying.

The quantity of the extracted thumbnails may be properly set according to a requirement. If there are too many selected thumbnails, the thumbnails displayed in the preview area 820 are too dense. As a result, the user is unable to clearly see the thumbnails and more memory is occupied by the thumbnails, which affects the performance of the application program. If there are too few selected thumbnails, the preview area 820 may be fully filled only by stretching and deforming the thumbnails. As a result, the appearance is affected and the selection of the user on the time points is also affected. In view of this, in an embodiment, thumbnails of 10 key frame pictures may be selected to fill the preview area 820 to represent the 5-min length.

To achieve the foregoing scrolling display effect, a constructed thumbnail table is based on an entire length of the video. A 30-min length is used as an example, and a quantity of to-be-extracted key frames may be, for example, 60 (=10*30/5). Correspondingly, steps 410 to 480 aim to finally generate 60 thumbnails by extracting key frames. In step 490, after the thumbnail is stored in a specified position, the thumbnail table may read the thumbnail from the specified position, for example, read 10 consecutive thumbnails each time, and display the thumbnail in the preview area 820.

Herein, a range of the thumbnail displayed in the preview area 820 may alternatively be determined based on an operation of the user. For example, the $1^{st}$ to $10^{th}$ thumbnails are initially displayed in the preview area 820. When determining that an operation of scrolling or dragging a mouse by a user is received in the preview area 820, a terminal may read, according to an operation range, and display, for example, the $2^{nd}$ to $11^{th}$, the $3^{rd}$ to $12^{th}$, or the $11^{th}$ to $20^{th}$ thumbnails in the preview area 820.

In an embodiment, a video playback progress in the display area 810 and the thumbnail display range in the preview area 820 may be set to be linked. For example, when a user chooses to fast-forward or rewind a video in the display area 810, the thumbnail range displayed in the preview area 820 also correspondingly slides backward or forward; on the contrary, when the user drags or scrolls the thumbnail backward or forward in the preview area 820, the video in the display area 810 is also correspondingly fast-forwarded or rewound.

The video editing scene displayed in FIG. 8 is only schematic, the embodiments of the present disclosure are not limited thereto, and may be further applied to, for example, various video processing scenes, such as, video preview, online video playback, video search, and video image primitive generation, and details are not described herein again.

In one embodiment of the present disclosure, a frame picture of a key frame at a specified time point may be quickly extracted by using a technical method of extracting a key frame picture of a video based on hard decoding. In addition, the extraction time of time points of the key frame table may be greatly reduced by using a technical method of extracting timestamps of the key frame table adaptively adjusting a sampling interval according to a video length. Moreover, in one embodiment of the present disclosure, format data of a video frame is extracted and stored by converting frame data in a YUV format into a bitmap of RGB, and specific zooming is performed according to a UI requirement to reduce time of storing and reading a JPEG picture, thereby greatly improving extraction of a video frame picture and reducing copying time of format data of a frame.

The following describes apparatus embodiments of the present disclosure, and the apparatus embodiments may be used for performing the video frame extraction method in the foregoing embodiment of the present disclosure. For details not disclosed in the apparatus embodiments of the present disclosure, reference is made to the embodiments of the foregoing video frame extraction method in the present disclosure.

Figure 9:
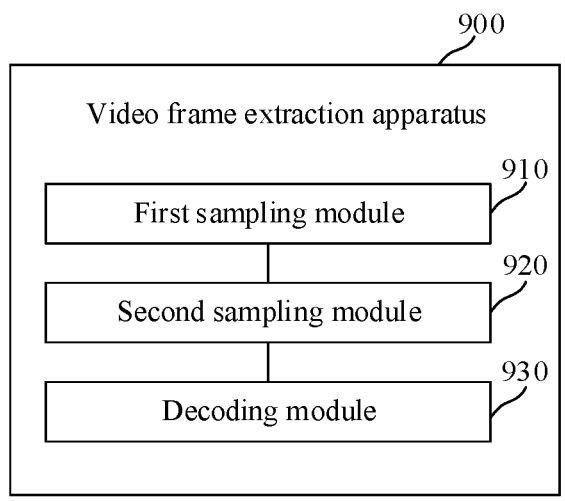
FIG. 9 is a schematic block diagram of a video frame extraction apparatus according to an embodiment of the present disclosure.

FIG. 9 is a schematic block diagram of a video frame extraction apparatus according to an embodiment of the present disclosure.

Referring to FIG. 9, a video frame extraction apparatus 900 according to an embodiment of the present disclosure includes: a first sampling module 910, a second sampling module 920 and a decoding module 930.

The first sampling module 910 is configured to obtain a key frame timestamp table of an object video based on a first sampling stride, the first sampling stride being adjusted according to a length of the object video; the second sampling module 920 is configured to obtain a timestamp of a to-be-extracted key frame from the key frame timestamp table based on a second sampling stride, the second sampling stride being determined according to a quantity of key frame timestamps of the key frame timestamp table and a quantity of to-be-extracted key frames; and the decoding module 930 is configured to read, according to the timestamp of the to-be-extracted key frame, frame data of a corresponding key frame, and generate, based on a hard decoding result of the frame data, a thumbnail corresponding to the key frame.

In some embodiments of the present disclosure, based on the foregoing solutions, the decoding module 930 includes: a hard decoding unit, configured to decode the frame data into YUV data through hard decoding; and a conversion unit, configured to convert the YUV data into red green blue RGB data to obtain a bitmap corresponding to the key frame.

In some embodiments of the present disclosure, based on the foregoing solutions, the decoding module 930 includes: a hard decoding unit, configured to decode the frame data by using the hardware decoder MediaCodec, and output YUV data obtained through decoding to an image data bearer class based on a getOutputImage method provided by MediaCodec; a YUV extraction unit, configured to determine an extraction manner of the YUV data based on the image data bearer class, and obtain Y, U, and V components of each pixel according to the determined extraction manner; and a conversion unit, configured to convert the Y, U, and V components of each pixel into corresponding RGB data to obtain a bitmap corresponding to the key frame.

In some embodiments of the present disclosure, based on the foregoing solutions, the decoding module 930 further includes: an input buffer unit, configured to pad a no-load input buffer with the frame data by using a readSampleData method of a MediaExtractor class, transmit the input buffer to MediaCodec for processing, and request a no-load input buffer from MediaCodec; and an output buffer unit, configured to request, from MediaCodec, a load output buffer padded with the YUV data, and release, after the bitmap corresponding to the key frame is obtained, the load output buffer to return a no-load output buffer to MediaCodec.

In some embodiments of the present disclosure, based on the foregoing solutions, the decoding module 930 further includes: a zooming unit, configured to zoom the bitmap according to a specified thumbnail size; and a compression unit, configured to compress and store the zoomed bitmap in a preset encoding format.

In some embodiments of the present disclosure, based on the foregoing solutions, the first sampling module 910 includes: a pointer unit, configured to move a data extraction pointer to key frames at time points in the object video according to the first sampling stride by using the seekTo method of the MediaExtractor class, the first sampling stride being an interval between adjacent time points; and a first sampling unit, configured to sequentially obtain timestamps corresponding to the key frames at the time points by using the getSampleTime method of the MediaExtractor class, and sequentially add the timestamps to the key frame timestamp table.

In some embodiments of the present disclosure, based on the foregoing solutions, the first sampling module 910 further includes: a splitting unit, configured to load the object video into a video splitter by using the setDataSource method of the MediaExtractor class, and obtain video track data of the object video by using the getTrackFormat method.

In some embodiments of the present disclosure, based on the foregoing solutions, the second sampling module 920 is configured to obtain a timestamp of a to-be-extracted key frame from the key frame timestamp table according to index=[m/n]*i+[m/n]/a, index representing a serial number or an index of each key frame timestamp in the key frame timestamp table; m representing a quantity of key frame timestamps in the key frame timestamp table; n representing a quantity of the to-be-extracted key frames (which is also a quantity of timestamps of the to-be-extracted key frames); [m/n] being the second sampling stride, representing that a result of dividing m by n is rounded; i representing a serial number or an index of a to-be-extracted key frame timestamp (e.g., in all timestamps of to-be-extracted key frames); and a being a positive integer.

In some embodiments of the present disclosure, based on the foregoing solutions, the video frame extraction apparatus 900 further includes: a storage module, configured to store the generated thumbnail in a specified position, so that a pre-generated thumbnail table reads the thumbnail from the specified position and displays the thumbnail.

Although a plurality of modules or units of a device configured to perform actions are discussed in the foregoing detailed description, such division is not mandatory. In fact, according to the embodiments of the present disclosure, features and functions of two or more modules or units described above may be specified in one module or unit. On the contrary, the features and functions of one module or unit described above may be further divided into a plurality of modules or units to be specified.

Through descriptions of the foregoing embodiments, it may be learned that the exemplary embodiments described herein can be implemented by software or by software in combination with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

It is to be understood that the present disclosure is not limited to the accurate structures that are described in the foregoing and that are shown in the accompanying drawings, and modifications and changes may be made without departing from the scope of the present disclosure. The scope of the present disclosure is subject only to the appended claims.

What is claimed is:

1. A video frame extraction method performed by a computing device, comprising:
    obtaining a key frame timestamp table of a video based on a first sampling stride, the first sampling stride being adjusted according to a length of the video;
    obtaining a timestamp of a key frame to be extracted from the key frame timestamp table based on a second sampling stride, the second sampling stride being determined according to a quantity of key frame timestamps in the key frame timestamp table and a quantity of to-be-extracted key frames;
    reading, according to the timestamp, frame data of the key frame; and
    generating, based on a hard decoding result of the frame data, a thumbnail corresponding to the key frame.

2. The video frame extraction method according to claim 1, wherein the generating, based on a hard decoding result of the frame data, a thumbnail corresponding to the key frame comprises:
    decoding the frame data into YUV data through hard decoding; and
    converting the YUV data into red green blue (RGB) data to obtain a bitmap corresponding to the key frame.

3. The video frame extraction method according to claim 1, wherein the generating, based on a hard decoding result of the frame data, a thumbnail corresponding to the key frame comprises:
    decoding the frame data by using a hardware decoder MediaCodec into YUV data, and outputting the YUV data to an image data bearer class based on a getOutputImage method provided by MediaCodec;
    determining an extraction manner of the YUV data based on the image data bearer class, and obtaining Y, U, and V components of each pixel according to the determined extraction manner; and
    converting the Y, U, and V components of each pixel into corresponding RGB data to obtain a bitmap corresponding to the key frame.

4. The video frame extraction method according to claim 3, further comprising:
    padding a no-load input buffer with the frame data by using a readSampleData method of a MediaExtractor class, transmitting the input buffer to MediaCodec for processing, and requesting a no-load input buffer from MediaCodec; and
    requesting, from MediaCodec, a load output buffer padded with the YUV data, and releasing, after the bitmap corresponding to the key frame is obtained, the load output buffer to return a no-load output buffer to MediaCodec.

5. The video frame extraction method according to claim 2, wherein the generating, based on a hard decoding result of the frame data, a thumbnail corresponding to the key frame further comprises:
    zooming the bitmap according to a specified thumbnail size; and
    compressing and storing the zoomed bitmap in a preset encoding format.

6. The video frame extraction method according to claim 1, wherein the obtaining a key frame timestamp table of the video based on a first sampling stride comprises:
    moving a data extraction pointer to key frames at time points in the video according to the first sampling stride by using a seekTo method of the MediaExtractor class, the first sampling stride being an interval between adjacent time points; and
    sequentially obtaining timestamps corresponding to the key frames at the time points by using a getSampleTime method of the MediaExtractor class, and sequentially adding the timestamps to the key frame timestamp table.

7. The video frame extraction method according to claim 6, further comprising:
    loading the video into a video splitter by using a setDataSource method of the MediaExtractor class, and obtaining video track data of the video by using a getTrackFormat method.

8. The video frame extraction method according to claim 1, wherein the obtaining a timestamp of a key frame to be extracted from the key frame timestamp table based on a second sampling stride comprises:
    obtaining the timestamp from the key frame timestamp table according to $index=[m/n]*i+[m/n]/a,$ index representing an index of each key frame timestamp in the key frame timestamp table; m representing the quantity of the key frame timestamps in the key frame timestamp table; n representing the quantity of the to-be-extracted key frames; [m/n] being the second sampling stride, representing that a result of dividing m by n is rounded; i representing an index of the timestamp of the key frame to be extracted; and a being a positive integer.

9. The video frame extraction method according to claim 1, further comprising:
    storing the generated thumbnail in a specified position, so that a pre-generated thumbnail table reads the thumbnail from the specified position and displays the thumbnail.

10. A video frame extraction apparatus, comprising: a memory and a processor coupled to the memory, the processor being configured to perform:
    obtaining a key frame timestamp table of a video based on a first sampling stride, the first sampling stride being adjusted according to a length of the video;
    obtaining a timestamp of a key frame to be extracted from the key frame timestamp table based on a second sampling stride, the second sampling stride being determined according to a quantity of key frame timestamps in the key frame timestamp table and a quantity of to-be-extracted key frames;

reading, according to the timestamp, frame data of the key frame; and generating, based on a hard decoding result of the frame data, a thumbnail corresponding to the key frame.

11. The apparatus according to claim 10, wherein the generating, based on a hard decoding result of the frame data, a thumbnail corresponding to the key frame comprises:

decoding the frame data into YUV data through hard decoding; and converting the YUV data into red green blue (RGB) data to obtain a bitmap corresponding to the key frame.

12. The apparatus according to claim 10, wherein the generating, based on a hard decoding result of the frame data, a thumbnail corresponding to the key frame comprises:

decoding the frame data by using a hardware decoder MediaCodec into YUV data, and outputting the YUV data to an image data bearer class based on a getOutputImage method provided by MediaCodec;

determining an extraction manner of the YUV data based on the image data bearer class, and obtaining Y, U, and V components of each pixel according to the determined extraction manner; and converting the Y, U, and V components of each pixel into corresponding RGB data to obtain a bitmap corresponding to the key frame.

13. The apparatus according to claim 12, wherein the processor is further configured to perform:

padding a no-load input buffer with the frame data by using a readSampleData method of a MediaExtractor class, transmitting the input buffer to MediaCodec for processing, and requesting a no-load input buffer from MediaCodec; and requesting, from MediaCodec, a load output buffer padded with the YUV data, and releasing, after the bitmap corresponding to the key frame is obtained, the load output buffer to return a no-load output buffer to MediaCodec.

14. The apparatus according to claim 11, wherein the generating, based on a hard decoding result of the frame data, a thumbnail corresponding to the key frame further comprises:

zooming the bitmap according to a specified thumbnail size; and compressing and storing the zoomed bitmap in a preset encoding format.

15. The apparatus according to claim 10, wherein the obtaining a key frame timestamp table of the video based on a first sampling stride comprises:

moving a data extraction pointer to key frames at time points in the video according to the first sampling stride by using a seekTo method of the MediaExtractor class, the first sampling stride being an interval between adjacent time points; and sequentially obtaining timestamps corresponding to the key frames at the time points by using a getSampleTime method of the MediaExtractor class, and sequentially adding the timestamps to the key frame timestamp table.

16. The apparatus according to claim 15, wherein the processor is further configured to perform:

loading the video into a video splitter by using a setDataSource method of the MediaExtractor class, and obtaining video track data of the video by using a getTrackFormat method.

17. The apparatus according to claim 10, wherein the obtaining a timestamp of a key frame to be extracted from the key frame timestamp table based on a second sampling stride comprises:

obtaining the timestamp from the key frame timestamp table according to $$\text{index}=[m/n]*i+[m/n]/a,$$

index representing an index of each key frame timestamp in the key frame timestamp table; m representing the quantity of the key frame timestamps in the key frame timestamp table; n representing the quantity of the to-be-extracted key frames; [m/n] being the second sampling stride, representing that a result of dividing m by n is rounded; i representing an index of the timestamp of the key frame to be extracted; and a being a positive integer.

18. The apparatus according to claim 10, wherein the processor is further configured to perform:

storing the generated thumbnail in a specified position, so that a pre-generated thumbnail table reads the thumbnail from the specified position and displays the thumbnail.

19. A non-transitory computer-readable medium, storing a computer program, the computer program, when executed by a processor, cause the processor to perform:

obtaining a key frame timestamp table of a video based on a first sampling stride, the first sampling stride being adjusted according to a length of the video;

obtaining a timestamp of a key frame to be extracted from the key frame timestamp table based on a second sampling stride, the second sampling stride being determined according to a quantity of key frame timestamps in the key frame timestamp table and a quantity of to-be-extracted key frames;

reading, according to the timestamp, frame data of the key frame; and generating, based on a hard decoding result of the frame data, a thumbnail corresponding to the key frame.

20. The storage medium according to claim 19, wherein the generating, based on a hard decoding result of the frame data, a thumbnail corresponding to the key frame comprises:

decoding the frame data into YUV data through hard decoding; and converting the YUV data into red green blue (RGB) data to obtain a bitmap corresponding to the key frame.

\* \* \* \* \*